United States Patent [19]
Funk et al.

[11] Patent Number: 5,672,189
[45] Date of Patent: Sep. 30, 1997

[54] GLASS BENDING PRESS APPLICATION

[75] Inventors: Dieter Funk, Witten; Dieter Bruns, Rheinberg; Rolf Wenning, Bocholt; Walter Brans, Recklinghausen, all of Germany

[73] Assignee: Flachglas Aktiengesellschaft, Furth, Germany

[21] Appl. No.: 422,500

[22] Filed: Apr. 12, 1995

[30] Foreign Application Priority Data

Apr. 15, 1994 [DE] Germany .................. 44 12 747.2

[51] Int. Cl.$^6$ ............................. C03B 11/12; C03B 23/03
[52] U.S. Cl. ................. 65/29.19; 65/106; 65/162; 65/273; 65/287; 65/288; 65/356; 65/374.12
[58] Field of Search .................... 65/29.19, 273, 65/106, 107, 287, 288, 356, 374.12, 162

[56] References Cited

U.S. PATENT DOCUMENTS

| | | | |
|---|---|---|---|
| 4,591,373 | 5/1986 | Sato | 65/29 |
| 4,861,253 | 8/1989 | Mattson | 425/143 |
| 4,883,526 | 11/1989 | Enk et al. | 65/104 |
| 4,957,531 | 9/1990 | McMaster et al. | 65/273 |
| 5,125,945 | 6/1992 | Menihan et al. | 65/66 |
| 5,279,635 | 1/1994 | Flaugher et al. | 65/103 |

FOREIGN PATENT DOCUMENTS

| | | |
|---|---|---|
| 0 677 489 A2 | 10/1995 | European Pat. Off. . |
| 1 935 161 | 1/1970 | Germany . |
| 90/11973 | 10/1990 | WIPO . |
| WO 90/15781 | 12/1990 | WIPO . |
| WO 93/14038 | 9/1993 | WIPO . |

OTHER PUBLICATIONS

"Stoffhutte", published by Verlag With.Ernst & Son, 1967, p. 231.

*Primary Examiner*—Donald E. Czaja
*Assistant Examiner*—Sean Vincent
*Attorney, Agent, or Firm*—Herbert Dubno

[57] ABSTRACT

Press-bending station for bending sheets of glass during the course of automated production of identical motor vehicle windows within specified batch sizes, where the glass sheets to be bent are heated in a continuous furnace to a specified bending temperature and directly after leaving the continuous furnace are fed in horizontal position with the aid of a horizontal conveyor into the press-bending station. It incorporates a male press mold and a female press mold. The male press mold is a cast full mold and consists of an aluminum alloy. The male press mold possesses heating passages for fluid heating with the aid of a liquid heat transfer medium and can be heated with sufficiently homogeneous temperature distribution to a thermal expansion temperature which is below the bending temperature. The temperature of the male press mold can be controlled and/or regulated by means of the liquid heat transfer medium. The thermal expansion temperature of the male press mold is controlled and/or regulated such that the specific thermal expansion of the male press mold and the thermal expansion of the glass sheet to be bent, placed centrally on the female press mold at bending temperature, practically correspond.

15 Claims, 3 Drawing Sheets

GLASS BENDING PRESS APPLICATION

FIELD OF THE INVENTION

Our present invention relates to a press-bending station for bending sheets of glass in the automated production of identical motor vehicle windows. More particularly the invention relates to a glass-bending apparatus for the reliable bending of automotive window glass.

BACKGROUND OF THE INVENTION

Automotive window glass is produced in specified batch sizes, wherein the glass sheets to be bent are heated in a continuous furnace to a specified bending temperature and directly after leaving the continuous furnace are fed in horizontal position with the aid of a horizontal conveyor into the press-bending station. The press-bending station incorporates in its press frame an upper male press mold or die and a lower female press mold or die having the form of an annular mold. Of course, the plan view of the male press mold or die is matched to the geometry of the glass sheets to be bent. It possesses a glass sheet contact surface designed to suit the curvature of the glass sheets to be bent. The bending operation takes place in a cyclic mode, one glass sheet follows the next. The glass-bending mold or die can have a male tool and a female tool. Of course, opening and closing of the press tools take place in the press-bending station in the same way as in a press.

In a known press-bending station (see WO 90/11973), importance is attached to the fact that the glass sheet contact surface is shaped to correspond to the curvature of the glass sheet to be bent. The configuration of the male press mold as a whole is left to choice. It is not heated and not cooled. The temperature which is reached in automatic operation of the press-bending station on the male press mold or on the glass sheet contact surface is taken into account and is regarded as suitable.

In practice, during the course of the known measures described above, the male press mold is of multi-layered construction with interposed thermal insulating layers.

Although the bent glass sheets remain in the press-bending station until the shape produced by the press-bending operation is sufficiently free from internal stresses in the bent glass sheets and consequently uniform cooling cannot lead to uncontrolled geometrical faults, during automated production of identical glass sheets within specified batch sizes, uncontrolled geometrical faults develop in the bent glass sheets. These are troublesome, particularly when high standards are imposed on accuracy of manufacture.

OBJECTS OF THE INVENTION

The principal object of the present invention is to provide a glass-bending apparatus for the purposes described which is free from the drawbacks of earlier systems.

It is another object to provide an improved press-station for bending glass sheets during the course of automated production of identical motor vehicle windows within specified batch sizes to ensure that uncontrolled geometrical faults no longer occur on the finish-bent glass sheets.

SUMMARY OF THE INVENTION

These objects are attained in a press bending station for bending glass sheets during the course of automated production of identical motor vehicle windows within specified batch sizes, where the glass sheets to be bent are heated in a continuous furnace to a specified bending temperature and directly after leaving the continuous furnace are fed in horizontal position with the aid of a horizontal conveyor into the press-bending station. The press-bending station incorporates in its press frame an upper male press mold and a lower female press mold having the form of an annular mold.

According to the invention:
a) the male press mold is a cast full mold consisting of an aluminum alloy,
b) the male press mold has heating passages for fluid heating with the aid of a liquid heat transfer medium and can be heated with a homogeneous temperature distribution to a thermal expansion temperature which is below the bending temperature,
c) the temperature of the male press mold can be controlled and/or regulated by means of the liquid heat transfer medium.

The thermal expansion temperature of the male press mold is controlled and/or regulated such that the specific thermal expansion of the male press mold and the thermal expansion of the glass sheet to be bent, placed centrally on the female press mold at bending temperature, practically correspond. It should be repeated once more that the plan view of the male press mold is matched to the geometry of the glass sheets to be bent and possesses a glass sheet contact surface designed to suit the curvature of the bent glass sheet. According to a preferred embodiment of the invention, the arrangement is such that at thermal expansion temperature the male press mold possesses a glass sheet contact surface corresponding to the curvature of the bent glass sheet. The glass sheet contact surface is shaped by machining.

We have found that uncontrolled variations in the geometry of otherwise identical bent glass sheets of a batch is due at least in part to differing thermal expansion of the glass sheets to be bent, and the male press mold at least in the region of the glass sheet contact surface. The invention can prevent these differences in thermal expansion and surprisingly can suppress the uncontrolled variations.

Surprisingly, it is not problematical that the glass sheets themselves experience cooling during the bending operation, while the temperature of the male press mold remains practically unchanged during the bending operation. It is known in principle (DE 19 35 161) for spring-back of the bent glass sheets with similar press-bending operations to be countered by counter-cooling of the glass sheets themselves which is effected by heating the male press mold which can also consist of an aluminum alloy. While in that case temperature correction is carried out on the bent glass sheets, according to the invention, thermal expansion correction takes place during bending of the glass sheets, that is to say with the aid of the principle of matching realized in combination with features a), b) and c). From the art (WO 90/11 973, DE 19 35 161), it was not realized that matched temperature regulation and control is necessary in order to prevent the differences in thermal expansion between the glass sheet contact surface of the male press mold and the glass sheet itself.

Within the scope of the invention, it is possible to work with the different aluminum alloys, for example with the alloys which are described in "Stoffhütte" (1967, published by Verlag Wilh. Ernst & Sohn, page 231). In particular, it is possible to work with aluminum casting alloys which have been developed for the sole plates of textile irons and objects subjected to similar stresses and which, in addition to their favorable thermal conductivity at the temperatures occurring, also possess relatively high strength.

In detail, there are several possibilities within the scope of the invention for further construction and design of a press-bending station according to the invention. In order to achieve extremely homogeneous temperature distribution in the male press mold, the invention teaches that the male press mold incorporates heating passages running transverse to the direction of travel of the horiontal conveyor which are connected to distributor pipes or manifolds so that heat transfer medium can flow through them. The temperature of the male press mold can be controlled and/or regulated by means of the mass flow and/or the temperature of the heat transfer medium.

Within the scope of the invention, a wide variety of liquid substances are suitable as heat transfer media. Preferably, the male press mold is heatable with a synthetic oil or a mineral oil as the heat transfer medium. With the glass sheets to be bent at a temperature of approximately 600° C., the male press mold should be at a temperature of approximately 200° C., at least in the region of its glass sheet contact surface.

Of course, in the case of the press-bending station according to the invention, the heating passages of the male press mold can be of different configurations. If an aluminum alloy is involved, which leads to practically pore-free male press molds, the heating passages can take the form of drilled holes. It is simpler to provide the male press mold with heating passages which consist of cast-in tubes, for example of cast in place steel tubes. Steel tubes possess coefficients of expansion such that problems resulting from different coefficients of expansion between the aluminum material of the male press molds on the one hand and the cast-in tubes on the other hand do not occur. In whatever way the heating passages are formed and configured, it is advisable for them to be suitable for a flow velocity of the heat transfer medium of approximately 1 liter/sec.

This is also recommended for control or regulation reasons with regard to the temperature of the male press mold or of the surface region of the male press mold at the glass sheet contact surface. If operated as described, the heating passages of the male press mold will generally possess an inside diameter in the region of 8 to 10 mm. If this geometry is implemented, the heat transfer medium should usefully possess a specific heat capacity in the region of between 1.5 and 2.5 kJ/kg. For this purpose, a synthetic oil or a mineral oil can be used which is resistant to evaporation at a temperature of approximately 300° C.

According to a method aspect of the invention, a method of operating the glass bending press can comprise the steps of:

(a) providing the male mold as an upper press mold of a press frame and forming the male mold as a cast aluminum body having heating passages for fluid heating by a liquid heat transfer medium passed through the passages homogeneously to a thermal expansion temperature which is below a bending temperature; and (b) controlling the temperature of the male mold by means of the medium such that the specific thermal expansion of the male mold and the thermal expansion of a glass sheet to be bent and placed centrally in the female mold substantially correspond.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
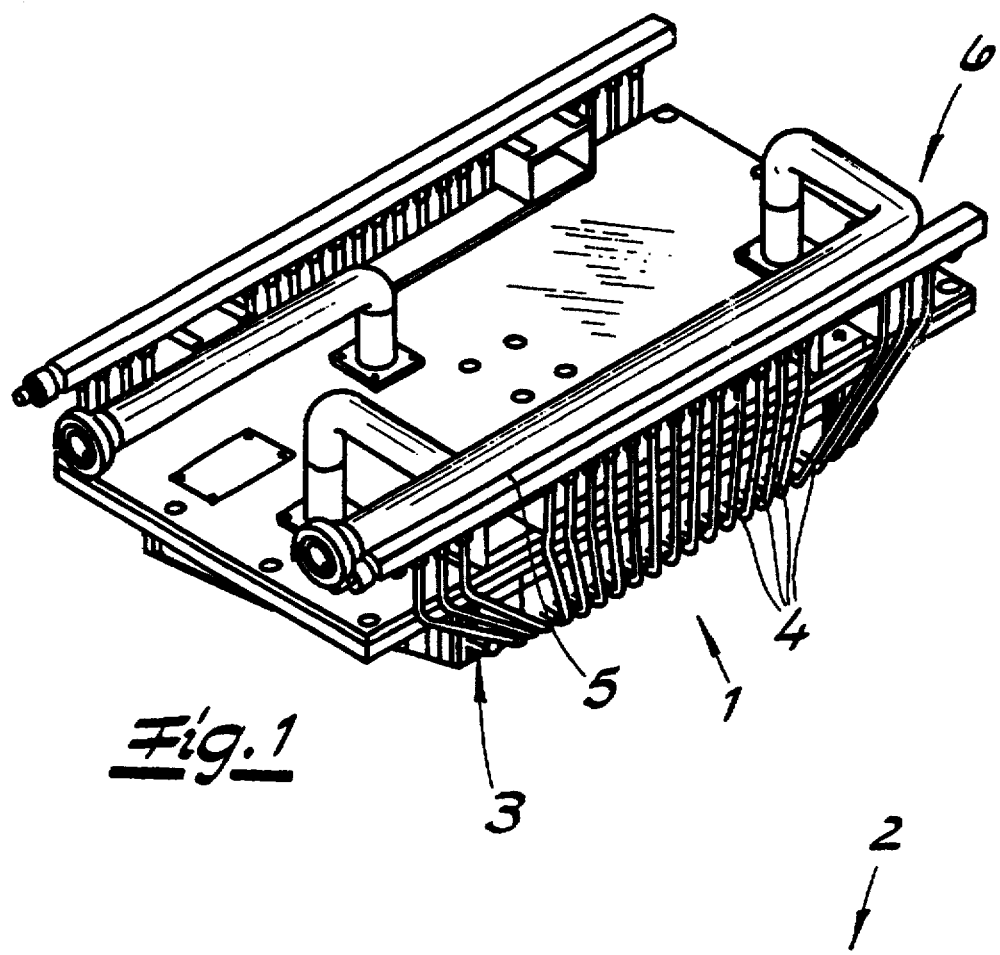
FIG. 1 is a respective view of the male press mold of a press-bending apparatus according to the invention.

The press-bending station to which the invention is directed is intended for bending glass sheets during the course of automated production of identical motor vehicle windows with specified batch sizes. Its basic configuration can be that described in Wo 90/11 973.

The glass sheets to be bent, which are not illustrated in the drawing, will during the course of automated production, be heated in a continuous furnace to a specified temperature and directly after leaving the continuous furnace will be fed in horizontal position into the press-bending station with the aid of a horizontal conveyor.

Figure 5:
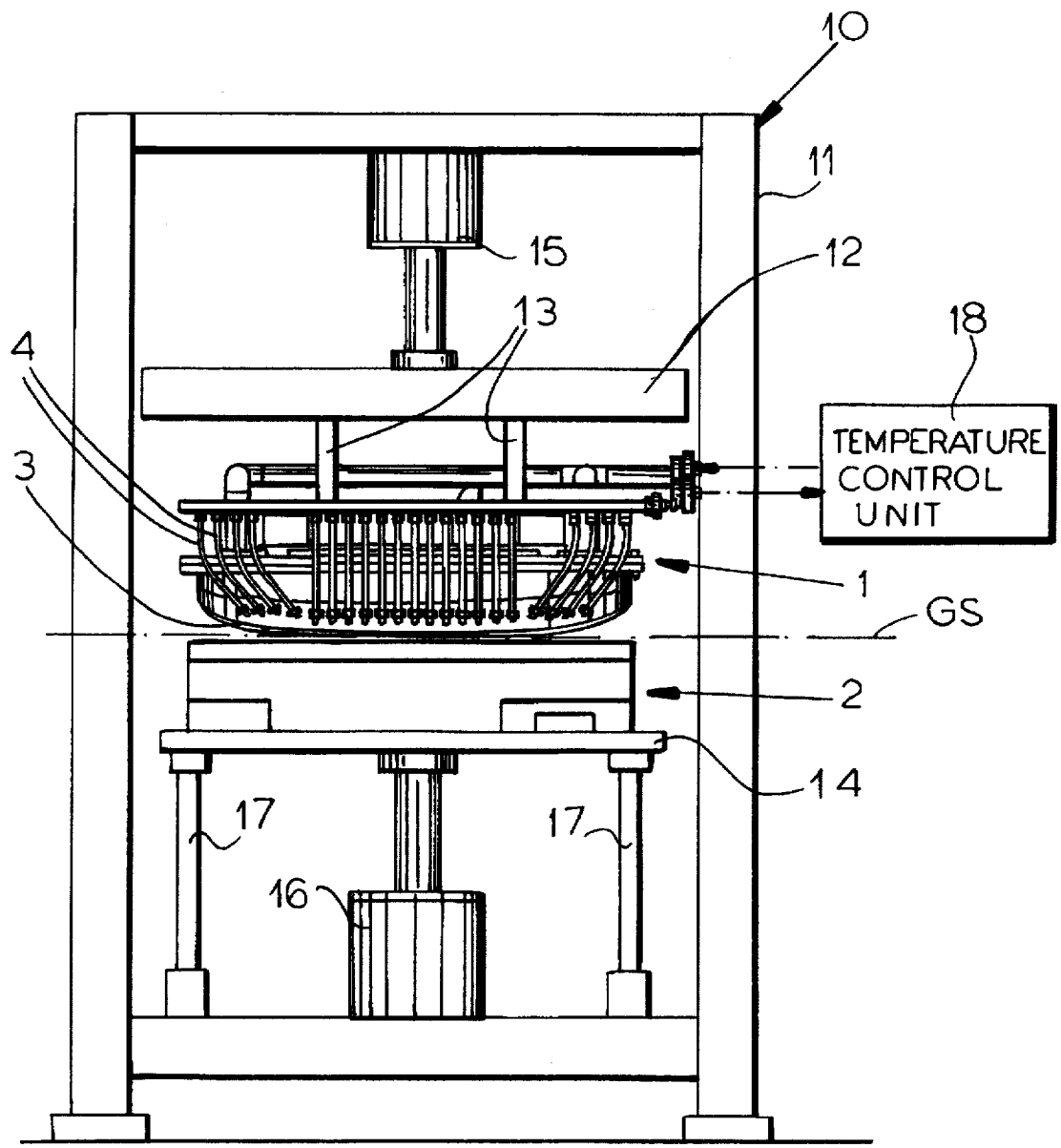
FIG. 5 is an elevational view of the bending press.

The overall configuration of the glass bending press 10 shown in FIG. 5, in general terms, comprises a frame 11 having an upper plate 12 on which the upper or male bending mold or die 1 is mounted at 13, and a lower plate 14 upon which the female press mold 2 is mounted.

The male mold can be displaced vertically by a hydraulic piston and cylinder arrangement 15 while the female mold can be displaced by a hydraulic piston and cylinder arrangement 16, the plates 12 and 14 being guided vertically by suitable guide rods as shown, for example, at 17 for the lower female press mold.

In FIG. 5 as well, we show a temperature control unit 18 which is connected to the fluid feed and return ducts of the upper mold to control the upper mold temperature so that the thermal expansion of the male press mold at its surface 3 engaging a glass sheet to be bent, represented by the dot-dash line GS is substantially the same as the thermal expansion of that glass sheet. Stated otherwise, the thermal expansion temperature of the male press mold is controlled such that the specific thermal expansion of the male press mold and the thermal expansion of the glass sheet to be bent and placed centrally on the female press mold practically correspond at bending temperature.

Figure 4:
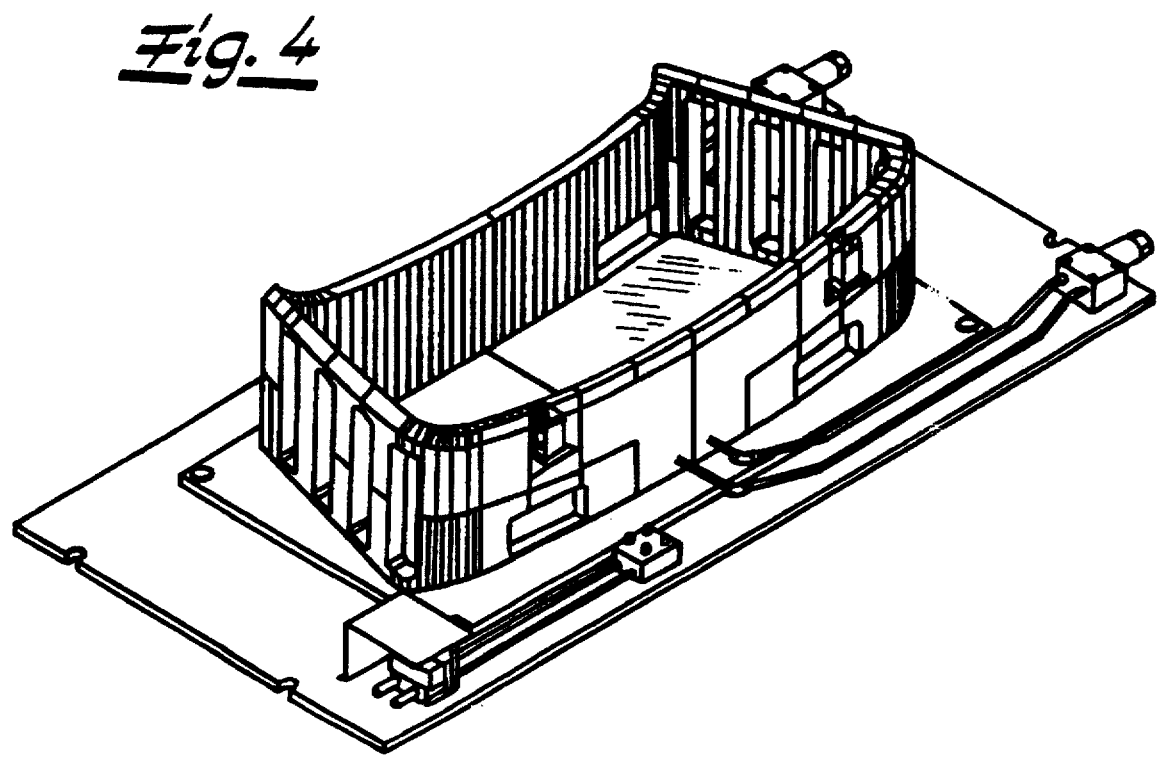
FIG. 4 is a perspective view of the female press mold corresponding to the male press mold which is the subject of FIG. 1.
Figure 2:
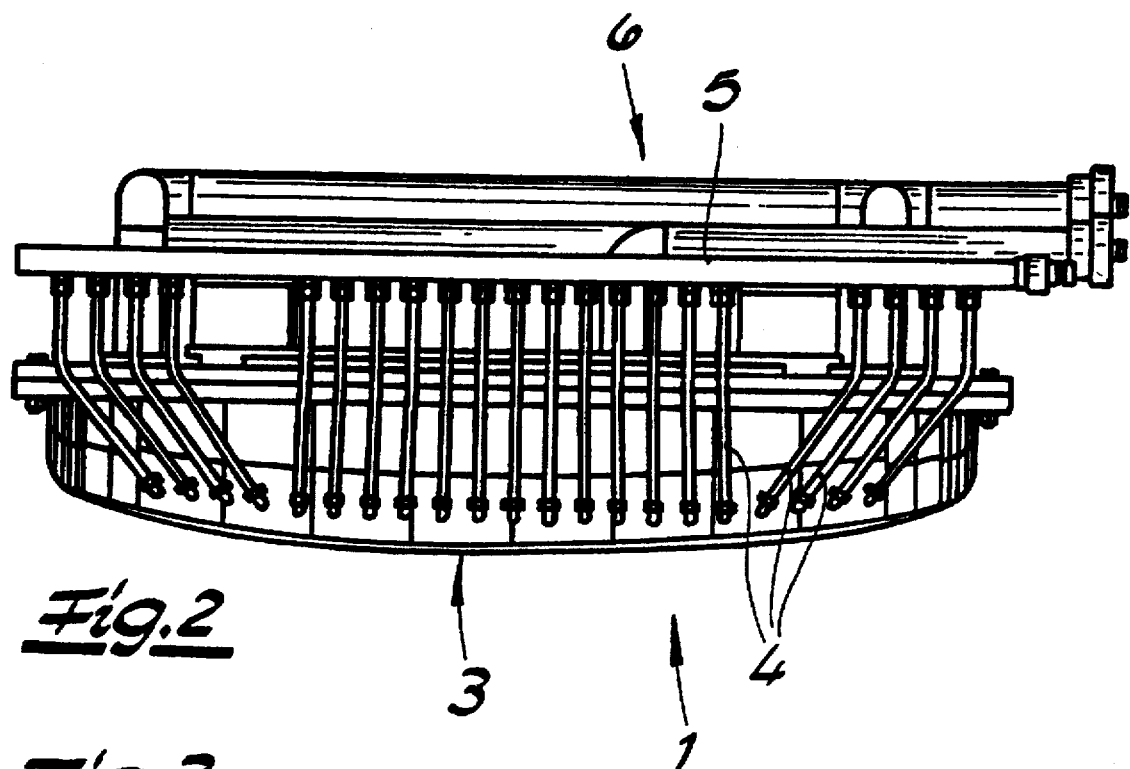
FIG. 2 is a side elevational view of the male mold of FIG. 1.
Figure 3:
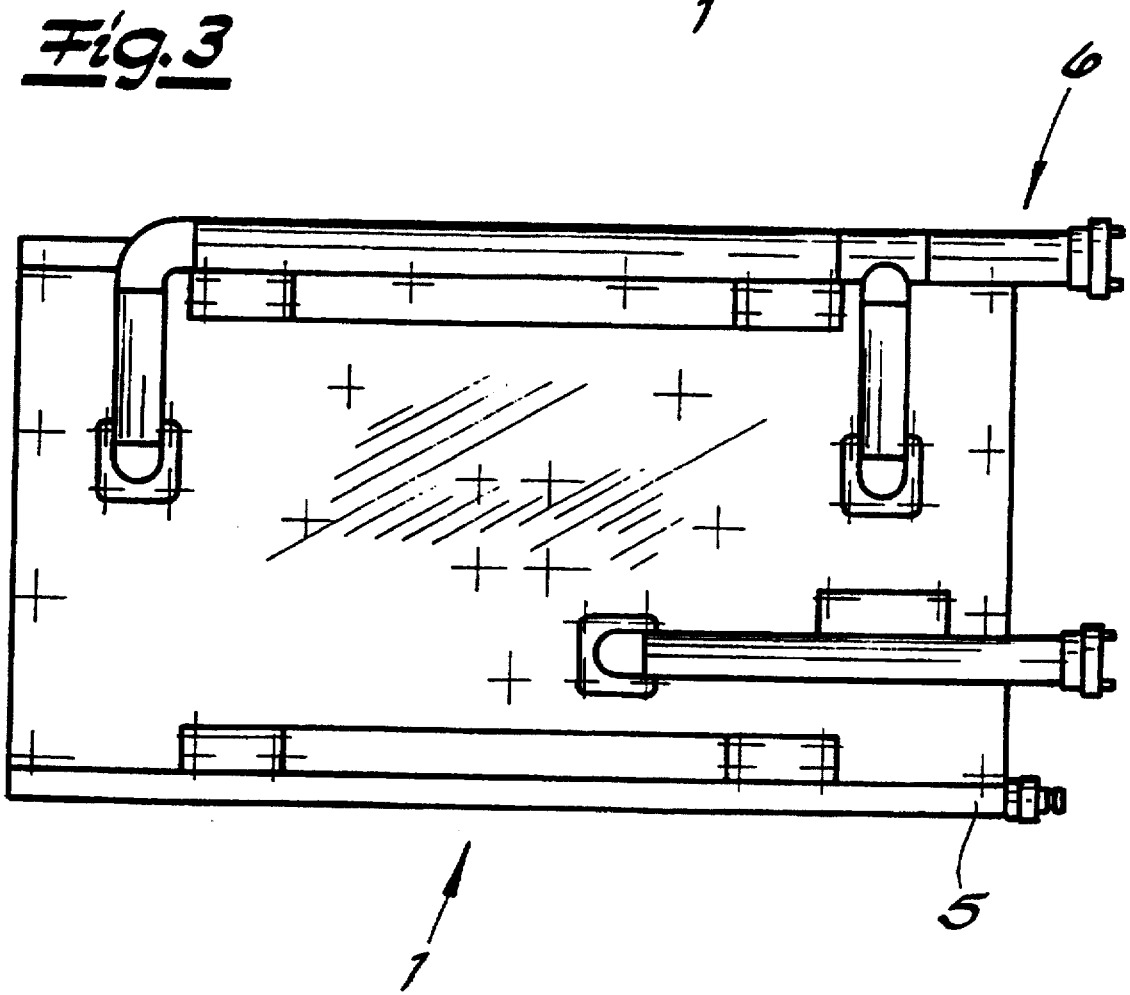
FIG. 3 is a plan view of the male press mold.

The press-bending station possesses in its press frame an upper male press mold 1, which has been illustrated in FIGS. 1 to 3, and lower female press mold 2 in the form of an annular mold, reference being made to FIG. 4. Of course, these press tools 1, 2 are assigned to one another in the press frame and the kinematics are as normally equipped for presses. The press tools 1, 2 correspond in the plan view of their geometry to that of the glass sheets to be bent. Male press mold 1 possesses a glass sheet contact surface 3 designed to suit the curvature of the bent glass sheets. In the illustrated example and according to the preferred embodiment of the invention, the arrangement is such that the bent glass sheets can be held in position under the male press mold 1 after the bending operation by vacuum. For this purpose, the male press mold 1 possesses holes and passages which are connected to a vacuum shaft. They have not been illustrated. When the press is open, they are deposited on a suitable means of conveyance. In this respect as well, reference is made to the state of the art.

From FIGS. 1 to 3, it can be seen that the male press mold takes the form of a cast full mold. According to the invention, it consists of an aluminum alloy. The male press mold possesses heating passages 4 for fluid heating with the aid of a liquid heat transfer medium. It can be heated with sufficiently homogeneous temperature distribution to a thermal expansion temperature which is below the bending temperature. The temperature of the male press mold 1 can be controlled and/or regulated by means of the mass flow of the liquid heat transfer medium. The thermal expansion temperature of the male press mold 1 is controlled and/or regulated such that the specific thermal expansion of male press mold 1 and the thermal expansion of the glass sheet to be bent, placed centrally on the female press mold 2 at bending temperature, practically correspond. The annular female press mold 2 can also be heated in the contact region of the glass sheet. The male press mold 1 possesses at thermal expansion temperature a glass sheet contact area corresponding to the curvature of the bent glass sheet.

In the example and according to the preferred embodiment of the invention, the male press mold 1 incorporates heating passages 4 running transverse to the direction of travel of the horizontal conveyor which are connected to distributor pipes 5 or manifolds 6 running in the direction of travel and through which the heat transfer medium can flow. The temperature of the male press mold 1 can, as already mentioned, preferably be controlled or regulated by the mass flow the fluid heat transfer medium. It can also be controlled or regulated by means of the temperature of the heat transfer medium. In the example, the male press mold 1 can be heated with a synthetic oil as heat transfer medium. When the temperature of the glass sheets to be bent is approximately 600° C., the male press mold 1 is at a temperature of approximately 200° C., at least in the region of the glass sheet contact area 3. The heating passages 4 may consist of cast-in tubes, in particular of cast-in steel tubes, which for reasons of scale cannot be seen in the FIGS. 1–5.

Figure 6:
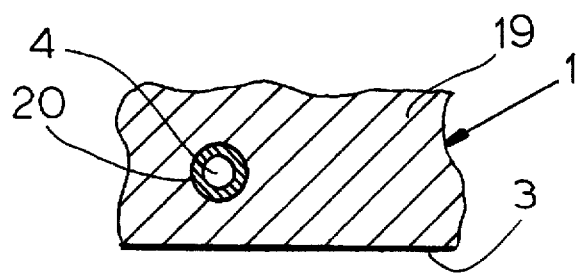
FIG. 6 is a sectional detail.

In FIG. 6, however, I have shown the fully cast aluminum body 19 of the male mold 1 with its surface 3 to have a heat passage 4 formed by a steel tube 20 which is cast in place.

Advantageously, the heating passages of the male press mold are dimensioned for a flow velocity of the heat transfer medium of approximately 1 liter/second, the heating passages of the male press mold possesses a diameter in the range of 8 to 10. The heat transfer medium is a mineral oil resistant to evaporation at a temperature of approximately 300° C. and possesses a specific heat capacity of 1.5 to 2.5 kJ/kg.

We claim:

1. A glass bending press for bending glass sheets in the formation of motor vehicle windows, comprising:

a press frame;

an upper male press mold mounted on said frame and comprising a cast solid body of aluminum formed with a convexly curved glass-engaging surface and provided with heating passages for fluid heating with a liquid heat transfer medium and with a homogeneous temperature distribution to a thermal expansion temperature below a bending temperature;

a lower female press mold in the form of an annular mold mounted on said frame below said male press mold and adapted to receive a succession of glass sheets heated in a continuous surface; and means for controlling a thermal expansion temperature of said male press mold so that a specific thermal expansion of said male press mold and a thermal expansion of a glass sheet to be bent placed centrally on said female press mold correspond at a bending temperature of the glass sheet.

2. The glass bending press defined in claim 1 wherein said surface of said male press mold has a glass sheet contact area defining curvature of a bent glass sheet to be produced in said press.

3. The press defined in claim 1 wherein glass sheets are fed to the press by a conveyor and said male press mold has heating passages transverse to a direction of travel of said conveyor and connected to distributor pipes running in said direction of travel and traversed by said medium.

4. The press defined in claim 1 wherein a temperature of said male press mold is controlled by regulating mass flow of said medium therethrough.

5. The press defined in claim 1 wherein a temperature of said male press mold is controlled by regulating a temperature of the medium traversing the male press mold.

6. The press defined in claim 1 wherein said medium is selected from the group which consists of synthetic oils and mineral oil.

7. The press defined in claim 1 wherein, for a temperature of the glass sheet to be bent of 600° C., the male press mold is at a temperature of 200° C. at the least at said surface.

8. The press defined in claim 1 wherein said passages are defined at least in part by steel tubes cast in place within the aluminum body of said male press mold.

9. The press defined in claim 1 wherein said means for controlling includes means for passing said medium through said mold with a flow velocity of approximately 1 liter/second.

10. The press defined in claim 1 wherein said passages have diameters of substantially 8 to 10 mm.

11. The press defined in claim 1 wherein said medium is a mineral oil resistant to evaporation at a temperature of approximately 300° C. and possesses a specific heat capacity of 1.5 to 2.5 kJ/kg.

12. A method of operating a glass bending press receiving glass sheets from a horizontal conveyor delivering said glass sheets from a furnace in the production of a series of automotive vehicle windows, and bending the glass sheets between a convex male mold and a concave female mold, said method comprising the steps of:

(a) providing said male mold as an upper press mold of a press frame and forming the male mold as a cast aluminum body having heating passages for fluid heating by a liquid heat transfer medium passed through said passages homogeneously to a thermal expansion temperature which is below a bending temperature; and (b) controlling a temperature of the male mold by means of the medium such that the specific thermal expansion of the male mold and the thermal expansion of a glass sheet to be bent and placed centrally in the female mold correspond.

13. The method defined in claim 12 wherein the temperature of the glass sheet to be bent is about 600° C. and the male mold is heated to a temperature of approximately 200° C. in a region of a glass sheet contact area of said male mold.

14. The method defined in claim 13 wherein said medium is passed through said mold with a flow velocity of approximately 1 liter/second.

15. The method defined in claim 14 wherein said medium is a mineral oil resistant to evaporation at a temperature of approximately 300° C. and has a specific heat capacity of 1.5 to 2.5 kJ/kg.

* * * * *